United States Patent
Takahata

(10) Patent No.: US 8,597,837 B2
(45) Date of Patent: Dec. 3, 2013

(54) METHOD FOR PRODUCING NONAQUEOUS ELECTROLYTE LITHIUM-ION SECONDARY BATTERY

(75) Inventor: Koji Takahata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/390,565

(22) PCT Filed: Aug. 24, 2009

(86) PCT No.: PCT/JP2009/064717
§ 371 (c)(1),
(2), (4) Date: Feb. 15, 2012

(87) PCT Pub. No.: WO2011/024250
PCT Pub. Date: Mar. 3, 2011

(65) Prior Publication Data
US 2012/0141869 A1 Jun. 7, 2012

(51) Int. Cl.
*H01M 10/058* (2010.01)

(52) U.S. Cl.
USPC .......................................................... 429/326

(58) Field of Classification Search
None
See application file for complete search history.

(56) References Cited

U.S. PATENT DOCUMENTS

2009/0142663 A1* 6/2009 Takeuchi et al. .............. 429/188

FOREIGN PATENT DOCUMENTS

| JP | 2002-8717 | 1/2002 |
|---|---|---|
| JP | 2002-158035 | 5/2002 |
| JP | 2002-359002 | 12/2002 |
| JP | 2003-151623 | 5/2003 |
| JP | 2007-53083 | 3/2007 |
| JP | 2007-134047 | 5/2007 |

OTHER PUBLICATIONS

Translation of the International Preliminary Report on Patentability for PCT/JP2009/064717 dated Mar. 15, 2012.
International Search Report in International Application No. PCT/JP2009/064717; Mailing Date: Oct. 6, 2009.

* cited by examiner

*Primary Examiner* — Patrick Joseph Ryan
*Assistant Examiner* — Wyatt McConnell
(74) *Attorney, Agent, or Firm* — Finnegan, Henderson, Farabow, Garrett & Dunner, LLP

(57) ABSTRACT

The present invention provides a method for producing a lithium-ion secondary battery with excellent high-temperature storage characteristics. The method for producing the lithium-ion secondary battery provided by the present invention includes a step of assembling a lithium-ion secondary battery using positive and negative electrodes, and a nonaqueous electrolyte containing in an organic solvent a lithium salt as a supporting salt, at least one type of substance selected from carboxylic acid anhydrides and dicarboxylic acids as additive A, and at least one type of substance selected from vinylene carbonate, vinylethylene carbonate, ethylene sulfite, and fluoroethylene carbonate as additive B; a step of carrying out initial charging of the assembled battery to a predetermined voltage; and a step of carrying out an aging treatment by keeping the battery at a temperature of 35° C. or higher for 6 hours or longer.

5 Claims, 4 Drawing Sheets

METHOD FOR PRODUCING NONAQUEOUS ELECTROLYTE LITHIUM-ION SECONDARY BATTERY

CROSS-REFERENCE TO RELATED APPLICATIONS

This application is a national phase application of International Application No. PCT/JP2009/064717, filed Aug. 24, 2009, the contents of which are incorporated herein by reference.

TECHNICAL FIELD

The present invention relates to a method for producing a lithium-ion secondary battery with excellent high-temperature storage characteristics.

BACKGROUND ART

Lithium-ion secondary batteries have positive and negative electrodes that can reversibly absorb and desorb lithium ions, and an electrolyte interposed between the both electrodes. Charging and discharging is accomplished by the back-and-forth movement of the lithium ions in the electrolyte between the both electrodes. Lithium-ion secondary batteries are used as a power source in various kinds of portable devices because they are lightweight and have a high energy density. Moreover, the use of lithium-ion secondary batteries has been studied in fields that require large capacity power sources such as hybrid automobiles, electric automobiles, and the like where even greater improvement in battery performance is needed. More specifically, excellent high-temperature storage characteristics are important in lithium-ion secondary batteries intended for application in automobiles or others in which environment temperature or storage temperature can be high. Patent Documents 1 to 3 can be noted as technical documents relating to the high-temperature storage characteristics of batteries.

Patent Document 1: Japanese Patent Application Laid-open No. 2003-151623
Patent Document 2: Japanese Patent Application Laid-open No. 2002-359002
Patent Document 3: Japanese Patent Application Laid-open No. 2007-134047

DISCLOSURE OF THE INVENTION

When a lithium-ion secondary batteries are charged and discharged, however, the electrolyte component (nonaqueous solvent, supporting salt, etc.) can cause a reductive decomposition reaction on the surface of the negative electrode, and the battery deteriorates as a result. Means of preventing this battery deterioration include a method wherein some of the electrolyte component is reductively decomposed intentionally during initial charging to coat the surface of the negative electrode with an SEI (Solid Electrolyte Interphase) film consist of these decomposition products. This can prevent further reductive decomposition of the electrolyte components at the surface of the negative electrode during normal battery use. There has been a problem with batteries of this form, however, because when they are left under high temperature conditions, additional decomposition product builds up on the SEI film, which causes the internal resistance to increase and, as a result, the battery deteriorates. Patent Document 1 indicates that adding a given additive to an electrolyte solution can reduce the rate of increase in internal resistance and improve high-temperature storage characteristics.

However, research by the inventors revealed that the effect of improved high-temperature storage characteristics by the simple addition of that additive to the electrolyte solution is inadequate or can be unstable in some cases.

An object of the present invention is to provide a method for stably producing a lithium-ion secondary battery with excellent high-temperature storage characteristics.

The inventors discovered that an even higher level of high-temperature storage characteristics can be stably realized by first assembling a lithium-ion secondary battery using an electrolyte containing certain types of additives, and then treating the assembled battery under specific conditions, thus completing the present invention.

The present invention provides a method for producing a lithium-ion secondary battery having positive and negative electrodes capable of absorbing and desorbing lithium ions, and a nonaqueous electrolyte containing a lithium salt as a supporting salt in an organic solvent. This production method includes a step of assembling a lithium-ion secondary battery using the abovementioned electrodes and nonaqueous electrolyte. As used herein, the nonaqueous electrolyte contains not only the lithium salt, but also at least one type of additive selected from a group consisting of carboxylic anhydrides and dicarboxylic acids as additive A; and at least one type of additive selected from a group consisting of vinylene carbonate (VC), vinyl ethylene carbonates (VEC), ethylene sulfite, and fluoroethylene carbonate as additive B. The above production method also comprises a step of performing an initial charge to the assembled battery, and an aging treatment step wherein the battery is kept at a temperature of 35° C. or higher for 6 hours or longer.

Performing the above aging treatment in a battery using an electrolyte solution with a composition containing additives A and B enables the stability of the SEI film formed on the surface of the negative electrode to be increased and the internal resistance to be reduced in comparison with before the aging treatment. Reducing the internal resistance once during the method of producing such a battery (i.e., prior to shipping) can increase the durability of the battery in subsequent high-temperature storage. Therefore, this production method can provide a lithium-ion secondary battery with excellent high-temperature storage characteristics.

In one preferred mode of the method for producing a lithium-ion secondary battery disclosed herein, the aging treatment step is carried out by keeping the battery at the above temperature for 40 hours to 50 hours. This treatment increases the stability of the SEI film even more, and can provide a lithium-ion secondary battery with even better high-temperature storage characteristics.

In another preferred mode, the aging treatment step is carried out by keeping the battery at a temperature of 40° C. to 80° C. This treatment increases the stability of the SEI film even more, and can provide a lithium-ion secondary battery with even better high-temperature storage characteristics.

As noted above, a lithium-ion secondary battery with excellent high temperature storage characteristics can be realized by the method disclosed herein. This kind of battery is most suitable as a battery to be mounted in a vehicle that can be let stand under high temperature conditions. Therefore, the present invention also provides a lithium-ion secondary battery produced by any of the methods disclosed herein, and a vehicle comprising that lithium-ion secondary battery. More specifically, preferably this vehicle (e.g., an automobile) is equipped with such a lithium-ion secondary battery as a power source (typically, a power source for a hybrid vehicle or electric vehicle).

DESCRIPTION OF EMBODIMENTS

Figure 1:
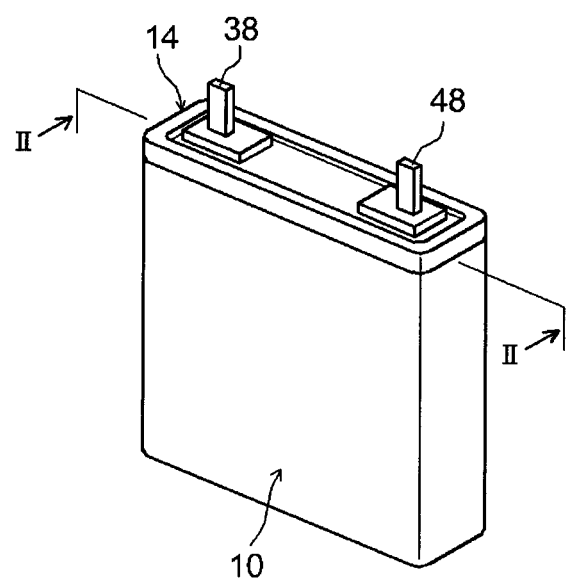
FIG. 1 is a perspective view schematically illustrating the external shape of the lithium-ion secondary battery in one embodiment.

Preferred embodiments of the present invention are described below. It should also be noted that matters necessary for carrying out the present invention other than those specifically referred to in this description are understood to be matters of design for a person skilled in the art based on the prior art in this field. The present invention can be carried out on the basis of the content disclosed herein and common technical knowledge in this field.

The technology disclosed herein can be applied to a lithium-ion secondary battery having an electrode assembly with a positive electrode, a negative electrode, and a nonaqueous electrolyte comprising a lithium salt as a supporting salt, additive A, and additive B, in an organic solvent (nonaqueous medium).

Any lithium salt that is generally used as a supporting salt in a lithium-ion secondary battery can be suitably selected and used as the supporting salt. Examples of such a lithium salt include $LiPF_6$, $LiBF_4$, $LiClO_4$, $LiAsF_6$, $Li(CF_3SO_2)_2N$, and $LiCF_3SO_3$. Only one type of these lithium salts can be used alone, or two or more types can be combined and used together. $LiPF_6$ can be noted as a particularly preferred example. Preferably the nonaqueous electrolyte is prepared so that the concentration of the supporting salt lies within the range of 0.7 mol/L to 1.3 mol/L.

Any organic solvent that is generally used in a lithium-ion secondary battery can be suitably selected and used as the nonaqueous medium. An example of a particularly preferred nonaqueous medium is a carbonate such as ethylene carbonate (EC), dimethyl carbonate (DMC), ethyl methyl carbonate (EMC), diethyl carbonate (DEC) and propylene carbonate (PC). Only one type of these organic solvents can be used alone, or two or more types can be combined and used together. For example, a mixture of EC, DMC, and EMC can be used in an approximate volumetric ratio of 2 to 5:2 to 5:2 to 5.

One type of substance selected from carboxylic acid anhydrides and dicarboxylic acids can be used alone, or two or more types can be combined and used together as additive A.

Preferred examples of carboxylic acid anhydrides to be used include maleic anhydride, succinic anhydride, citraconic anhydride, glutaric anhydride, diglycolic anhydride, cyclohexane dicarboxylic acid anhydride, phenyl succinic anhydride, and 2-phenyl glutaric anhydride. Maleic anhydride can be noted as a particularly preferred carboxylic acid anhydride.

Preferred examples of dicarboxylic acids to be used include oxalic acid, malonic acid, maleic acid, succinic acid, citraconic acid, glutaric acid, diglycolic acid, cyclohexane dicarboxylic acid, phenyl succinic acid, and 2-phenyl glutaric acid. Oxalic acid can be noted as a particularly preferred dicarboxylic acid.

Preferably the total amount of additive A contained in the nonaqueous electrolyte lies in the range of about 0.05% by mass to 5% by mass (more preferably, about 0.1% by mass to 1% by mass).

One type of substance selected from vinylene carbonate (VC), vinyl ethylene carbonates (VEC), ethylene sulfite, and fluoroethylene carbonate can be used alone, or two or more types can be combined and used together as additive B.

Preferably the amount of additive B contained in the nonaqueous electrolyte lies in the range of about 0.05% by mass to 5% by mass (more preferably, about 0.1% by mass to 1% by mass).

Preferably the mass ratio of additive A to additive B contained in the nonaqueous electrolyte is about 1:4 to 4:1 (more preferably 1:2 to 2:1). The above mass ratio (ratio of added amounts) can be used when, for example, additive A is maleic anhydride and additive B is VC.

Preferably the technology disclosed herein can be applied to the production of a lithium-ion secondary battery wherein such a nonaqueous electrolyte is used. That production method comprises: a step of placing the above electrode assembly and the above nonaqueous electrolyte in a battery case; carrying out initial charging up to a designated potential (precharge treatment) on the assembled battery; and carrying out an aging treatment by keeping the initially charged battery within a given temperature range for a given amount of time.

The method for producing the lithium-ion secondary battery as in the present invention is described in detail below while referencing the drawings, which use as an example a lithium-ion secondary battery 100 (FIG. 1) configured by placing the electrode assembly and nonaqueous electrolyte in a square battery case. More specifically, the shape of the lithium-ion secondary battery of the present invention is not particularly limited, and the material, shape, size, etc., of components such as the battery case and electrode assembly can be suitably selected according to the intended use and capacity. For example, the battery case can have a rectangular, flat, cylindrical, or other shape. It should also be noted that in the following drawings, all members and sites providing the same effect are indicated by the same reference numbers, and redundant descriptions have been omitted or abbreviated. Moreover, the dimensional relationships (of length, width, height, etc.) in the drawings do not depict actual dimensional relationships.

Figure 2:
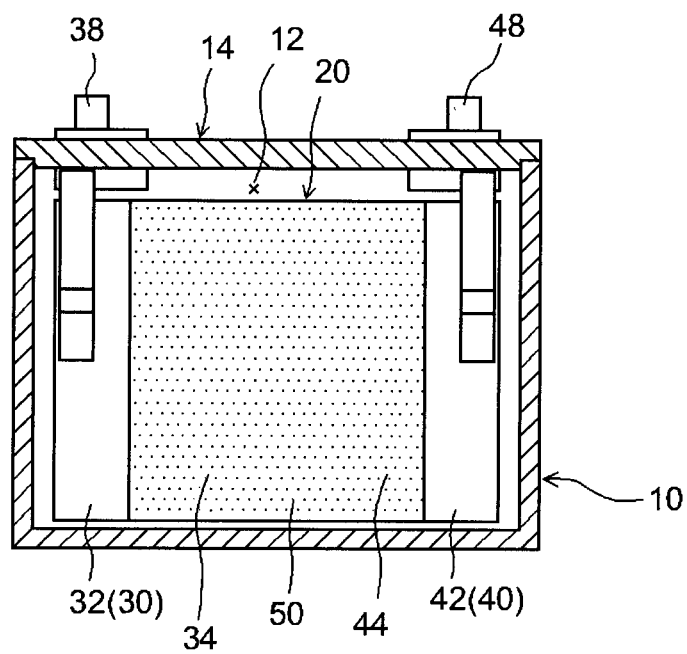
FIG. 2 is a cross-sectional view taken along the line II-II of FIG. 1.

The production method for the lithium-ion secondary battery disclosed herein includes a step of assembling a battery by placing an electrode assembly having a positive electrode comprising a positive electrode active material and a negative electrode comprising a negative electrode active material in a battery case together with the above nonaqueous electrolyte. As illustrated in FIG. 1 and FIG. 2, the lithium-ion secondary battery in these embodiments, i.e., lithium-ion secondary battery 100, that is the object to which the technology disclosed herein is applied, can be constructed by placing a wound electrode assembly 20 together with an electrolyte solution (not illustrated) into a flattened box-shaped battery case 10 that matches the shape of the electrode assembly 20 via an opening 12, and sealing the opening 12 in the case 10 with a lid 14. Furthermore, a positive terminal 38 and a negative terminal 48 for connection to the outside are provided in the lid 14 such that a part of each protrudes from the inside through the surface of the lid 14.

The above electrode assembly 20 is formed into a flattened shape by overlaying and winding a positive electrode sheet 30, which is formed by a positive electrode active material layer 34 on the surface of a long sheet positive current collector 32, and a negative electrode sheet 40, which is formed by a negative electrode active material layer 44 on the surface of a long sheet negative current collector 42, together with two long sheet separators 50, and then deforming the resulting wound assembly by lateral compression.

In addition, the positive electrode sheet 30 is formed to expose the positive current collector 32 by not providing (or removing) the positive electrode active material layer 34 at one end thereof along the lengthwise direction. Similarly, the negative electrode sheet 40 is formed to expose the negative current collector 42 by not providing (or removing) the negative electrode active material layer 44 at one end thereof along the lengthwise direction. The positive terminal 38 is connected to the exposed end of the positive current collector 32 and the negative terminal 48 is connected to the exposed end of the negative current collector 42, respectively, to form electrical connections with the positive electrode sheet 30 and the negative electrode sheet 40 of the wound current collector 20 that has been formed into a flattened shape. The positive and negative terminals 38, 48 are connected to their respective positive and negative collectors 32, 42, for example, by ultrasonic welding, resistance welding, and the like.

Next, initial charging is carried out on the battery 100 that has been assembled as described above. In this initial charging step an external power source is connected between the positive electrode (positive terminal 38) and negative electrode (negative terminal 48) of the battery, and a precharging treatment is carried out at ordinary temperature (typically, about 25° C.) until the voltage between the terminals reaches a predetermined value.

Preferably the predetermined voltage between the terminals lies in the range between 2.5 V to 4.2 V, and a range between 3.0 V and 4.1 V is particularly preferred. The initial charging step can be carried out, for example, using constant current-constant voltage charging (CC-CV charging) wherein charging is carried out from the start at a constant current of about 0.1 C to 10 C until the voltage between the terminals reaches a predetermined value, and then charging is carried out at a constant voltage until the SOC (State of Charge) reaches about 60% to 100%. Alternatively, charging can be carried out from the start of charging at a charge rate (current value) of ⅓ C or less (typically ¹⁄₂₀ C to ⅓ C) until at least an SOC of 20% is reached, and then charging is carried out at a constant current of about 0.1 C to 10 C until the voltage between the terminals reaches a predetermined value, and moreover charging at a constant voltage is carried out until the SOC reaches about 60% to 100%.

It should also be noted that in the initial charging step, for example, a voltmeter can be connected between the positive terminal 38 and negative terminal 48 in the lithium-ion secondary battery 100, the voltage measured by the voltmeter can be monitored, and the charging can be ended when a predetermined given voltage value has been reached. Furthermore, after the initial charging step has been completed, a discharge treatment can be performed at a current value approximately equal to the charge rate during constant current-constant voltage charging as a conditioning treatment, and then several charge-discharge cycles can be repeated at about the same rate as current value thereof. Alternatively, several charge-discharge cycles can be repeated at a rate different from the charge-discharge rate of the charge-discharge cycle.

Next, in the above aging treatment step the battery 100 that has undergone initial charging is kept (e.g., left undisturbed) for 6 hours or longer (preferably 30 hours or longer, more preferably 40 hours or longer) at a temperature of 35° C. or higher. This aging treatment enables post-treatment internal resistance to be reduced to below the pretreatment value. Preferably the above aging temperature is about 35° C. to 85° C. (more preferably 40° C. to 80° C., and even more preferably 50° C. to 70° C.). If the aging temperature is much lower than this range, the effect of reducing initial internal resistance may be insufficient. Conversely, if the aging temperature is much higher than this range, the nonaqueous medium and supporting salt will decompose, etc., resulting in possible deterioration of the electrolyte solution and an increase in internal resistance. The upper boundary of the aging time is not particularly limited herein, but whenever it exceeds about 50 hours, the drop in initial internal resistance slows dramatically until the internal resistance value is nearly constant. Therefore, from the standpoint of reducing costs, preferably the aging time will be about 6 hours to 50 hours (more preferably 30 hours to 50 hours, and even more preferably, 40 hours to 50 hours).

Preferably prior art publicly known heating means can be used to keep the battery 100 under the kind of high-temperature conditions described above. For example, an infrared heater or other heat source (heating device) can be brought into direct contact with the lithium-ion secondary battery 100 to heat it to the high-temperature region noted above. Alternatively, the battery 100 can be placed in a constant temperature device or other heated container, and the battery 100 can be kept at the aging temperature by maintaining (controlling) the inside of the container at a given temperature within the above range.

It should also be noted that, as shown in Examples 3 to 8 below, normally in an initially charged lithium-ion secondary battery the internal resistance will tend to be higher after an aging treatment carried out in a high-temperature region (e.g., 40° C. to 80° C.) than before the aging treatment or than after an aging treatment carried out at room temperature. In contrast to this normal tendency, the internal resistance is decreased by an aging treatment at a high-temperature region in a nonaqueous electrolyte with the composition disclosed herein, and this finding is an unexpected effect that was discovered by the inventors.

Although it is unnecessary to the clarify the phenomena that occur in the respective initial charging and aging treatment steps in order to carry out the present invention, the following events are thought to occur.

The reductive decomposition, polymerization, and the like of the components of the nonaqueous electrolyte (organic solvent, supporting salts, additive A, additive B, etc.) in the initial charging step, which can also be considered an initial deterioration, produces compounds that adhere to the surface of the negative electrode as an SEI film. In this case, modification of the SEI film and partial leaching of these compounds into the electrolyte solution occur as a result of carrying out the above aging treatment that involves keeping the battery at a temperature higher than room temperature for a given period of time, and that can increase the homogeneity and stability of the SEI film. Alternatively, the SEI film can become thinner. This can reduce the internal resistance of the battery 100, and can also inhibit further deterioration of the nonaqueous electrolyte components. Furthermore, this reduction in initial internal resistance and the low, horizontal change over time in the increase in internal resistance can contribute to the realization of even better high-temperature storage characteristics even under long-term, high temperature storage.

Constituent elements of the present invention other than those noted above are described in detail below.

Preferably the positive electrode active material layer 34 can be formed, for example, by dispersing the positive electrode active material in a suitable solvent together with a conductive material, binder, etc., as needed to prepare a paste or slurry composition (positive electrode mixture), and then applying the same to the positive current collector 32 and drying.

A positive electrode material capable of absorbing and desorbing lithium can be used as the positive electrode active material, and one or more types of materials used in the past in lithium-ion secondary batteries (for example, an oxide with a layered structure or an oxide with a spinel structure) can be used with no particular limitation herein. Examples include lithium-containing composite oxides such as lithium-nickel composite oxides, lithium-cobalt composite oxides, lithium-manganese composite oxides, and lithium-magnesium composite oxides.

The term lithium-nickel composite oxide used herein encompasses not only oxides having lithium (Li) and nickel (Ni) as constituent metal elements, but also oxides that include at least one type of metal element other than lithium and nickel (i.e., a transition metal element and/or conventional metal element other than Li and Ni) as a constituent metal element at a ratio roughly equal to or less than nickel (typically a ratio less than nickel) when calculated by the number of atoms. The metal element other than Li and Ni can be, for example, one or more types of metal elements selected from a group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). It should also noted that this definition likewise applies to lithium-cobalt composite oxides, lithium-manganese composite oxides, and lithium-magnesium composite oxides.

Moreover, an olivine lithium phosphate represented by the general formula $LiMPO_4$ (wherein M is at least one or more types of elements from among Co, Ni, Mn, and Fe; e.g., $LiFePO_4$ and $LiMnPO_4$) can be used as the positive electrode active material.

The amount of positive electrode active material contained in the positive electrode mixture can be, for example, about 85% by mass to 95% by mass.

Preferably a conductive powdered material such as carbon powder, carbon fibers, etc., is used as the conductive material. Various types of carbon black, for example, acetylene black, furnace black, Ketjen black, graphite powder and the like are preferred as the carbon powder. Only one type of conductive material can be used alone, or two or more types can be combined and used together.

The amount of conductive material contained in the positive electrode material can be suitably selected in accordance with the type and amount of positive electrode active material, and can be set, for example, at about 4% by mass to 15% by mass.

A material suitably selected, for example, from water-soluble polymers that dissolve in water, water-dispersible polymers, polymers that dissolve in a nonaqueous medium (organic solvent), and the like can be used as the binder. Only one type of material can be used alone, or two or more types can be combined and used together.

Examples of water-soluble polymers include carboxy methylcellulose (CMC), methylcellulose (MC), cellulose acetate phthalate (CAP), hydroxypropyl methylcellulose (HPMC), hydroxypropyl methylcellulose phthalate (HP-MCP) and polyvinyl alcohols (PVA).

Examples of water-dispersible polymers include polytetrafluoroethylene (PTFE), tetrafluoroethylene-perfluoro-alkyl vinyl ether copolymer (PFA), tetrafluoroethylene-hexafluoropropylene copolymer (FEP), ethylene-tetrafluoro-ethylene copolymer (ETFE), and other fluorinated resins; and vinyl acetate copolymers, styrene butadiene block copolymers (SBR), acrylic acid-modified SBR resins (SBR latex), gum arabic, and other types of rubber.

Examples of polymers that dissolve in a nonaqueous medium (organic solvent) include poly(vinylidene fluoride) (PVDF), poly(vinylidene chloride)(PVDC), polyethylene oxide (PEO), polypropylene oxide (PPO), and polyethylene oxide-polypropylene oxide copolymer (PEO-PPO).

The amount of added binder can be suitably selected in accordance with the type and amount of positive electrode active material, and can be set, for example, at about 1% by mass to 5% by mass of the positive electrode mixture.

Preferably a conductive material containing a metal with good conductivity is used in the positive current collector 32. For example, aluminum or an alloy having aluminum as the primary component can be used. The shape of the positive current collector 32 is not particularly limited herein because it can differ in accordance with the shape, etc., of the lithium-ion secondary battery, and it can assume a variety of shapes such as a rod, plate, sheet, foil, mesh, and so on. In these embodiments a sheet-shaped aluminum positive current collector 32 is used, and preferably it is used in a lithium-ion secondary battery 100 having a wound electrode assembly 20. In these embodiments, for example, preferably an aluminum sheet with a thickness of about 10 μm to 30 μm can be used.

Moreover, preferably the negative electrode active material layer 44 can be formed, for example, by dispersing the negative electrode active material in a suitable solvent together with a negative conductive material, binder, etc., (negative electrode mixture) to prepare a paste or slurry composition, and then applying the same to the negative current collector 42 and drying.

One or more types of materials used previously in lithium-ion secondary batteries can be used as the negative electrode active material without limitation. For example, carbon particles can be noted as a suitable negative electrode active material. Preferably a particulate carbon material (carbon particles) at least partly comprising a graphite structure (layered structure) is used. So-called black leads (graphites), non-graphitizable carbons (hard carbons), graphitizable carbons (soft carbons), and any carbon material having a combination of these structures can be suitably used. From among these alternatives, natural graphite and other graphite particles in particular can be preferably used. Graphite particles have excellent conductivity because they can suitably absorb lithium ions as charge carriers. Moreover, they can serve as a negative electrode active material suited for rapid charging and discharging (e.g., high output discharging) because they have a small particle size, and a large surface area per unit volume.

The amount of negative electrode active material contained in the negative electrode mixture is not particularly limited herein, but is preferably about 90% by mass to 99% by mass, and more preferably about 95% by mass to 99% by mass.

As the binder for the negative electrode active material, only one type of substance similar to that of the positive electrode noted above can be used alone, or two or more types thereof can be combined and used together. The amount of added binder can be suitably selected in accordance with the type and amount of negative electrode active material, and can be set, for example, at about 1% by mass to 5% by mass of the negative electrode active material.

Preferably a conductive material containing a metal with good conductivity is used as the negative current collector 42. For example, copper or an alloy having copper as the primary component can be used. The shape of the negative current collector 42 is not particularly limited herein because it can differ in accordance with the shape, etc., of the lithium-ion secondary battery, and it can assume a variety of shapes such as a rod, plate, sheet, foil, mesh, and so on. In these embodiments a sheet-shaped copper negative current collector 42 is used, and preferably it is used in a lithium-ion secondary battery 100 having a wound electrode assembly 20. For example, preferably a copper sheet with a thickness of about 6 μm to 30 μm can be used in these embodiments.

Moreover, the above separator 50 is a sheet disposed between the positive electrode sheet 30 and the negative electrode sheet 40 such that it is in contact with both the positive electrode active material layer 34 of the positive electrode sheet 30 and the negative electrode active material layer 44 of the negative electrode sheet 40. In addition, the separator has the role of preventing electrical shorts arising from direct contact between the active material layers 34, 44 on the active electrode sheet 30 and the negative electrode sheet 40, and the role of forming a conductive path between the electrodes through the penetration of the electrolyte solution into the pores of the separator 50. Preferably a porous sheet of resin (microporous resin sheet) can be used as the constituent material of this separator 50. A porous polyolefin resin of polyethylene (PE), polypropylene (PP), polystyrene, and the like is preferred. In particular, PE sheets, PP sheets, or a sheet with a bilayer structure formed by overlaying a PE layer and a PP layer can be most suitably used. Preferably the thickness of the separator is established within a range, for example, of about 10 μm to 40 μm.

Several embodiments relevant to the present invention are described below, but this is by no means intended to limit the present invention to these embodiments. In the following explanation the terms "parts" and "%" refer to "parts by mass" and "percentage by mass (mass %)" unless specifically stated otherwise.

[Battery Fabrication]

Examples 1 and 2

For the positive electrode mixture a slurry composition was prepared by mixing the powdered positive electrode active material, acetylene black (conductive material), and PVDF (binder) at a mass ratio of 85:10:5 with N-methyl-2-pyrrolidone (NMP) so that the solids concentration (NV) would be about 50%. In this case, powdered lithium-manganese oxide ($LiMn_2O_4$) with an average particle size of 7 μm, specific surface area of 1 $m^2$/g, and a theoretical discharge capacity of 90 mA/g was used as the positive electrode active material.

The positive electrode mixture was applied to both sides of a continuous sheet aluminum foil 15 μm thick (positive current collector) so that the total amount applied to both sides would be 240 g/$m^2$ (as NV). After drying, this was compressed so that the total thickness would be about 110 μm to obtain the positive electrode sheet.

For the negative electrode mixture a slurry composition was prepared by mixing natural graphite, SBR, and CMC at a mass ratio of 98:1:1 with deionized water so that the NV concentration would be about 45%. The negative electrode mixture was applied to both sides of a continuous sheet copper foil 10 μm thick (negative current collector) so that the total amount applied to both sides would be 80 g/$m^2$ (as NV). After drying, this was compressed so that the total thickness would be about 65 μm to obtain the negative electrode sheet.

For the nonaqueous electrolyte a mixed solvent of EC, DMC, and EMC at a volumetric ratio of 1:1:1 was used to prepare an $LiPF_6$ solution with a concentration of 1 mol/L, and then 1% by mass of maleic anhydride (additive A) and 1% by mass of VC (additive B) were added thereto.

Two 20 μm thick continuous porous polyethylene sheets were readied as separators.

Using these battery components a model 18650 (cylindrical, 18 mm diameter and 65 mm high) lithium-ion secondary battery 200 was fabricated in the manner described below. In other words, the positive electrode sheet, negative electrode sheet and two separators were suitably layered, and the layered assembly was wound in the lengthwise direction to fabricate a wound electrode assembly. This electrode assembly was placed in a cylindrical container together with the nonaqueous electrolyte, and the container was sealed to construct a battery.

[Initial Charging Treatment]

Constant current charging for 3 hours at a rate of 1/10 C was carried out on the constructed battery, and then three cycles of charging to 4.1 V at a rate of 1/3 C and discharging to 3.0 V at a rate of 1/3 C were repeated to obtain the battery of Example 1.

The battery of Example 2 was obtained in the same manner as in Example 1.

Examples 3 and 4

The respective batteries of Examples 3 and 4 were obtained in the same manner as in Example 1 except additive A was not added to the electrolyte solution.

Examples 5 and 6

The respective batteries of Examples 5 and 6 were obtained in the same manner as in Example 1 except additive B was not added to the electrolyte solution.

Examples 7 and 8

The respective batteries of Examples 7 and 8 were obtained in the same manner as in Example 1 except neither additive A nor additive B was added to the electrolyte solution.

[Aging Treatment]

An aging treatment was performed by keeping the batteries of Examples 1, 3, 5, and 7 at 60° C. for 24 hours.

An aging treatment was also performed by keeping the batteries of Examples 2, 4, 6, and 8 at room temperature (23° C.) for 24 hours.

[Measurement of Initial Internal Resistance]

After the aging treatment the SOC (State of Charge) was adjusted to 60%, and the battery voltage (V) was measured 10 seconds after drawing currents (I) of 0.2 A, 0.4 A, 0.6 A and 1.2 A at 25° C. Linear regression was applied to the relation of the current I (X-axis) against the voltage V (Y-axis) of each battery, and the initial IV resistance (mΩ) was determined from the slope.

[Measurement of Capacity Retention]

Each battery was first adjusted to SOC 80%, the battery was CC-discharged at room temperature (23° C.) to SOC 0% at a rate of ⅓ C, and the discharge capacity was measured at that time and used as the initial capacity value.

After each battery was stored at 60° C. for 30 days, the post-storage discharge capacity was measured in the same manner as the initial capacity. The capacity retention (%) was determined as the percentage of the post-storage discharge capacity versus the initial capacity.

[Measurement of Increase in Internal Resistance]

For each stored battery the post-storage IV resistance (mΩ) was measured in the same manner as the initial internal resistance. The difference between the initial IV resistance value and the post-storage IV resistance value was used as the increase in internal resistance (mΩ).

Table 1 shows the measurement results, the amounts of additive A and additive B that were used, and the aging conditions for Examples 1 to 8.

[Test of Correlation Between Aging Treatment Time and Internal Resistance]

Figure 3:
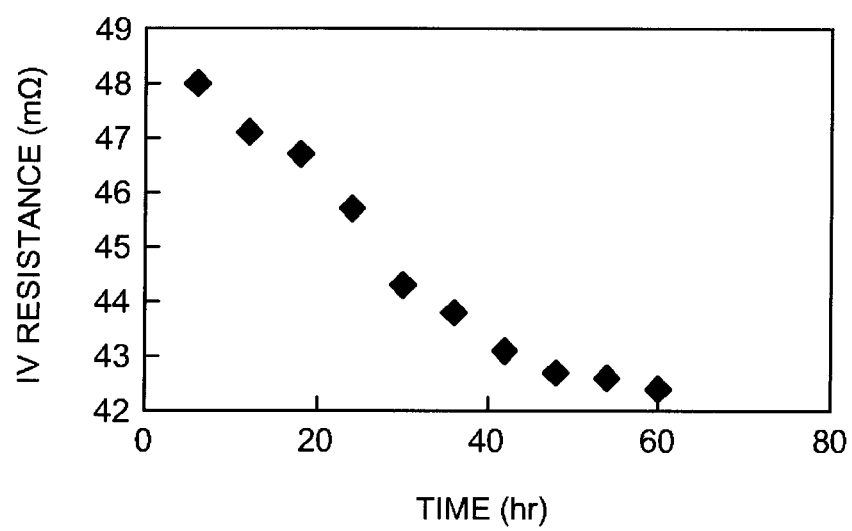
FIG. 3 is a graph illustrating the change in internal resistance plotted against aging treatment time in a lithium-ion secondary battery of one embodiment.

Batteries fabricated in the same manner as Example 1 were subjected to aging treatments at a fixed temperature of 60° C. and times varying from 6 hours to 60 hours, and the post-treatment IV resistance at each time was measured in the same manner as described above. The aging treatment times were established at 6-hour intervals from 6 hours to 60 hours. The results are shown in FIG. 3.

Incidentally, when the aging treatment was carried out with the temperature fixed at room temperature (23° C.) and the time varied between 6 hours and 60 hours, the IV resistance value remained almost unchanged at 49%.

[Test of Correlation Between Aging Treatment Temperature and Internal Resistance]

Figure 4:
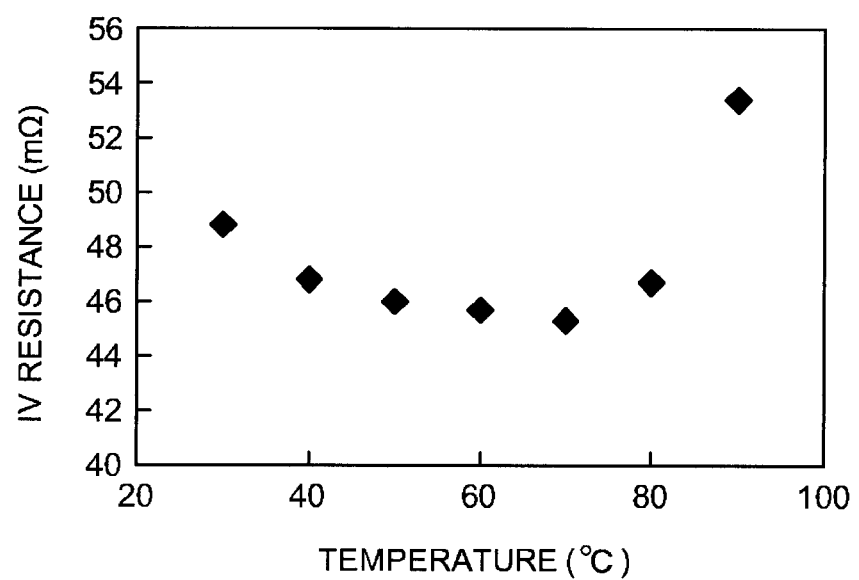
FIG. 4 is a graph illustrating the change in internal resistance plotted against aging treatment temperature in a lithium-ion secondary battery of one embodiment.
Figure 5:
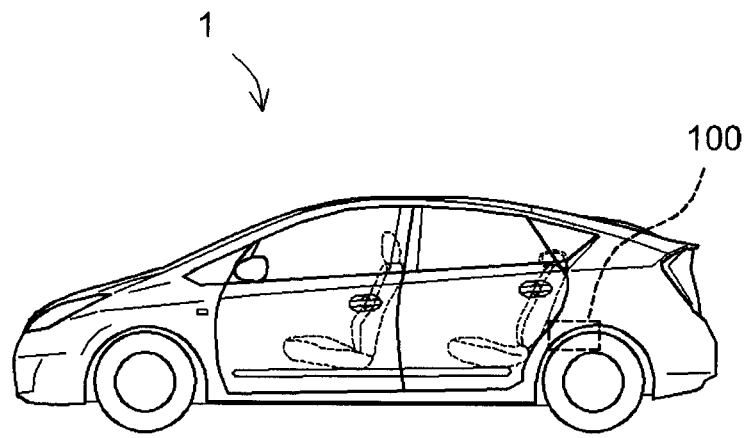
FIG. 5 is a side view schematically illustrating a vehicle (automobile) comprising the lithium-ion secondary battery of the present invention.
Figure 6:
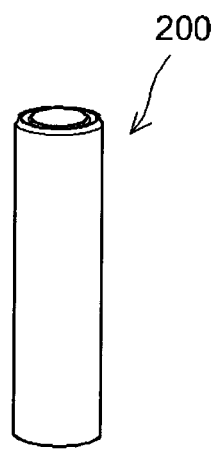
FIG. 6 is a perspective drawing schematically illustrating the shape of a model 18650 lithium-ion battery.

Batteries fabricated in the same manner as Example 1 were subjected to aging treatments at a fixed time of 24 hours and temperatures varying from 30° C. to 90° C., and the post-treatment IV resistance was measured at each temperature in the same manner as described above. The aging temperatures were established at 10° C. intervals from 30° C. to 90° C. The results are shown in FIG. 4.

As shown in Table 1, between the two batteries of Examples 7 and 8 with nonaqueous electrolytes containing neither additive A nor additive B, the battery of Example 7 that was aged at 60° C. for 24 hours was found to have a higher internal resistance value and poorer high-temperature storage characteristics than the battery of Example 8 that was aged at room temperature for the same length of time. More specifically, both initial internal resistance and internal resistance after storage at 60° C. for 30 days were higher in the battery in Example 7 than battery in Example 8, and the amount of increase in internal resistance due to storage was also higher.

The tendency noted above for the internal resistance and high-temperature storage characteristics to be poorer with aging at 60° C. than at room temperature was similar in the batteries of Examples 3 and 4 that used additive A alone (i.e., did not use additive B), and in the batteries of Examples 5 and 6 that used additive B alone (i.e., did not use additive A).

Conversely, with the batteries of Examples 1 and 2 that used a nonaqueous electrolyte with a composition that contained both additive A and additive B, the effect of aging at 60° C. on the internal resistance value and high-temperature storage characteristics revealed a trend opposite to that of Examples 3 to 8. In other words, between the two batteries of Examples 1 and 2 with a nonaqueous electrolyte to which 1% by mass each of additive A and additive B was added, the battery of Example 1 that was aged at 60° C. for 24 hours had lower initial internal resistance than the battery of Example 2 that was aged at room temperature for the same duration, and even after storage at 60° C. for 30 days, the internal resistance was held to a lower value as well. Moreover, the batteries of Examples 1 and 2 both exhibited high capacity retention of about 90%.

Furthermore, as shown in FIG. 3, when batteries fabricated in the same manner as Example 1 were aged at 60° C. for 6 hours to 60 hours, the IV resistance value slowly decreased from 6 hours to 50 hours, but after 50 hours of aging the rate of decrease in the IV resistance value leveled off conspicuously.

In addition, as shown in FIG. 4, when batteries fabricated in the same manner as Example 1 were aged from 30° C. to 90° C. for 24 hours, there was no change in the initial resistance at 30° C. compared with batteries kept at room temperature for the same length of time.

Concrete embodiments of the present invention have been described in detail, but these are merely examples and by no means limit the scope of the claims. The technology described in the claims also includes various modifications and changes in the concrete embodiments exemplified above.

TABLE 1

| | Additive | | Aging conditions | | Initial IV resistance (mΩ) | After aging at 60° C. for 30 days | | |
|---|---|---|---|---|---|---|---|---|
| Example | A (mass %) | B (mass %) | Temp. (° C.) | Time (h) | | Post-aging IV resistance (mΩ) | Increase in internal resistance (mΩ) | Capacity retention (%) |
| 1 | 1 | 1 | 60 | 24 | 46 | 53 | 7 | 87 |
| 2 | 1 | 1 | 23 | 24 | 49 | 56 | 7 | 88 |
| 3 | 0 | 1 | 60 | 24 | 56 | 74 | 18 | 88 |
| 4 | 0 | 1 | 23 | 24 | 54 | 73 | 19 | 87 |
| 5 | 1 | 0 | 60 | 24 | 50 | 61 | 11 | 82 |
| 6 | 1 | 0 | 23 | 24 | 48 | 58 | 10 | 82 |
| 7 | 0 | 0 | 60 | 24 | 53 | 73 | 20 | 81 |
| 8 | 0 | 0 | 23 | 24 | 52 | 70 | 18 | 80 |

[Explanation of references]

| | |
|---|---|
| 1 | Vehicle |
| 20 | Wound electrode assembly |
| 30 | Positive electrode sheet |
| 32 | Positive current collector |
| 34 | Positive electrode active material layer |

| [Explanation of references] | |
|---|---|
| 38 | Positive terminal |
| 40 | Negative electrode sheet |
| 42 | Negative current collector |
| 44 | Negative electrode active material layer |
| 48 | Negative terminal |
| 50 | Separator |
| 100, 200 | Lithium-ion secondary battery |

The invention claimed is:

1. A method for producing a lithium-ion secondary battery having positive and negative electrodes capable of absorbing and desorbing lithium ions, and a nonaqueous electrolyte containing a lithium salt in an organic solvent, the production method comprising:

assembling a lithium-ion secondary battery using a nonaqueous electrolyte containing in the organic solvent the following components:

a lithium salt as a supporting salt;

maleic anhydride as additive A; and vinylene carbonate as additive B; and the positive and negative electrodes, the positive electrode comprising an oxide having a spinel structure that is capable of absorbing and desorbing lithium ions as a positive electrode active material;

performing an initial charge to the assembled battery up to a predetermined voltage; and performing an aging treatment to the battery by keeping at a temperature of 40 to 80° C. for 40 to 50 hours.

2. A lithium-ion secondary battery manufactured by the method according to claim 1.

3. A vehicle comprising the lithium-ion secondary battery according to claim 2.

4. The method of claim 1, wherein the initial charge is performed within a range between 2.5 V to 4.2 V.

5. The method of claim 1, wherein the nonaqueous electrolyte consists of the lithium salt, maleic anhydride, vinylene carbonate and the organic solvent.

* * * * *